US012688015B2

(12) United States Patent
Vrablik et al.

(10) Patent No.: US 12,688,015 B2
(45) Date of Patent: Jul. 21, 2026

(54) REMOTE ORCHESTRATOR FOR SOFTWARE BUILD AND TEST TOOL

(71) Applicant: GM Cruise Holdings LLC, San Francisco, CA (US)

(72) Inventors: Jason Vrablik, Monroe, WA (US); Eben Freeman, Mammoth Lakes, CA (US); Mahmood Miah, Seattle, WA (US); Jason Chan, Andover, MA (US)

(73) Assignee: GM Cruise Holdings LLC, San Francisco, CA (US)

( * ) Notice: Subject to any disclaimer, the term of this patent is extended or adjusted under 35 U.S.C. 154(b) by 233 days.

(21) Appl. No.: 18/403,940

(22) Filed: Jan. 4, 2024

(65) Prior Publication Data

US 2025/0224933 A1 Jul. 10, 2025

(51) Int. Cl.
| | |
|---|---|
| *G06F 8/35* | (2018.01) |
| *G06F 8/10* | (2018.01) |
| *G06F 9/54* | (2006.01) |
| *G06F 11/362* | (2025.01) |

(52) U.S. Cl.
CPC .................. *G06F 8/35* (2013.01); *G06F 8/10* (2013.01); *G06F 9/547* (2013.01); *G06F 11/3636* (2013.01)

(58) Field of Classification Search
CPC ... G06F 8/35; G06F 8/10; G06F 9/547; G06F 11/3636
USPC .................................................. 717/104–121
See application file for complete search history.

(56) References Cited

U.S. PATENT DOCUMENTS

| | | | | |
|---|---|---|---|---|
| 8,875,109 | B2 * | 10/2014 | Murthy ............... | G06F 11/3604 717/108 |
| 9,612,850 | B2 * | 4/2017 | Tibble ................. | G06F 9/44521 |
| 9,665,849 | B2 * | 5/2017 | Casey ................. | G06F 9/44521 |
| 9,767,284 | B2 * | 9/2017 | Ghose .................. | G06F 9/3854 |
| 10,671,510 | B1 * | 6/2020 | Willson .............. | G06F 11/3676 |
| 10,691,514 | B2 * | 6/2020 | McClory .......... | G06Q 10/06398 |

(Continued)

OTHER PUBLICATIONS

Wang et al, "Requirements-Driven Automated Software Testing: A Systematic Review", ACM, pp. 1-68 (Year: 2025).*

(Continued)

*Primary Examiner* — Anil Khatri
(74) *Attorney, Agent, or Firm* — Honigman LLP; Matthew H. Szalach

(57) ABSTRACT

A remote build orchestrator for building and testing a software program is described. The remote build orchestrator includes a generator service for generating a build graph from a definition of the software program input to the remote build orchestrator. The build graph includes a plurality of actions, wherein the actions are defined by inputs, outputs, and commands, and wherein outputs of actions that are dependent on other actions for inputs are represented in the build graph by placeholders. The remote build orchestrator also includes an unwinder service for receiving the build graph from the generator service and processing the build graph into a series of requests for execution of the actions. The remote build orchestrator further includes a remote build execution service for executing the actions in response to the received requests and returning results of the executing to the unwinder service.

13 Claims, 9 Drawing Sheets

(56)                    References Cited

U.S. PATENT DOCUMENTS

| 11,740,894 | B2 * | 8/2023 | K | G06F 8/71 |
| | | | | 717/120 |
| 11,782,685 | B2 * | 10/2023 | Krishnamoorthy | G06F 8/71 |
| | | | | 717/136 |
| 12,111,957 | B2 * | 10/2024 | Novotny | G06F 21/64 |
| 12,155,781 | B1 * | 11/2024 | Helfgott | H04L 9/3239 |
| 12,321,773 | B1 * | 6/2025 | Walsh | G06N 20/00 |
| 2019/0303579 | A1 * | 10/2019 | Reddy | H04L 9/3239 |

OTHER PUBLICATIONS

Yin et al, "Testing Graph Databases with Synthesized Queries", ACM, pp. 1-26 (Year: 2025).*
Papamanthou et al, "Reckle Trees: Updatable Merkle Batch Proofs with Applications", ACM, pp. 1-15 (Year: 2024).*
Mardiansyah et al, "Multi-State Merkle Patricia Trie (MSMPT): High-Performance Data Structures for Multi-Query Processing Based on Lightweight Blockchain", IEEE, pp. 1-15 (Year: 2023).*
Mitra et al, "Graph Coded Merkle Tree: Mitigating Data Availability Attacks in Blockchain Systems Using Informed Design of Polar Factor Graphs", IEEE, pp. 1-19 (Year: 2023).*

* cited by examiner

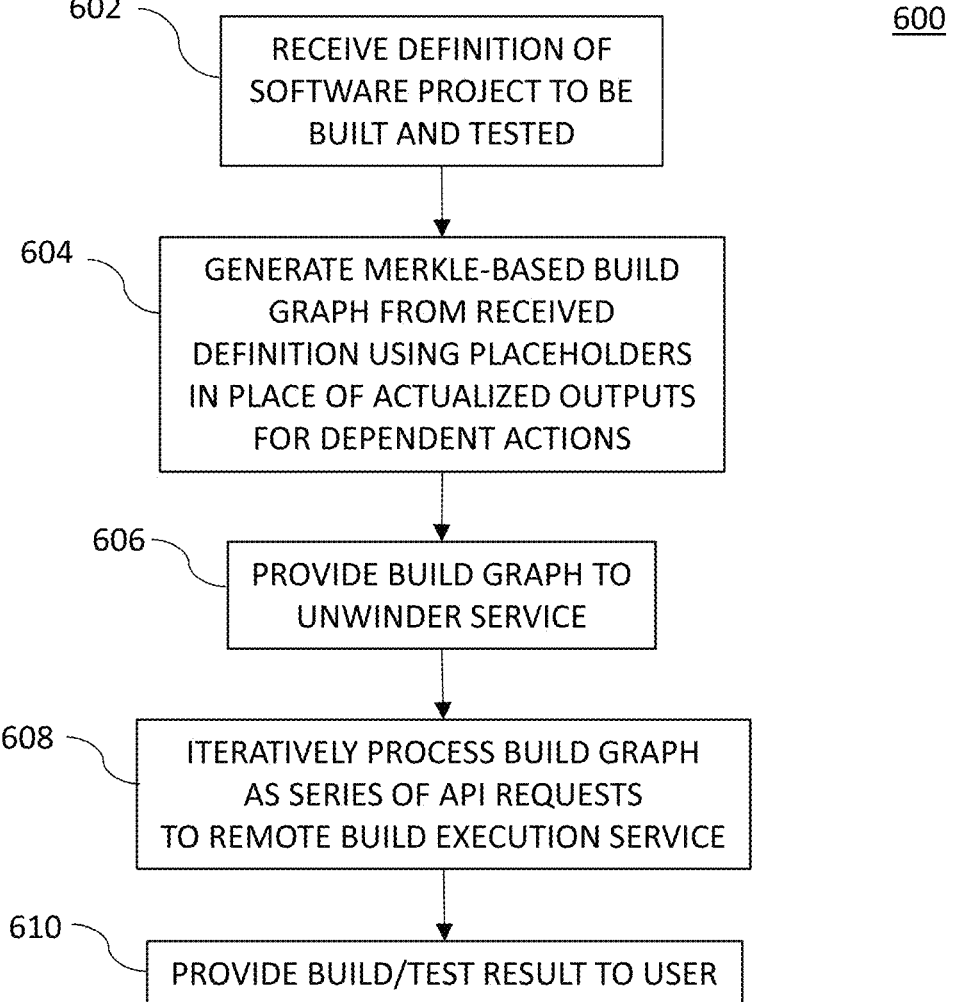

602 — RECEIVE DEFINITION OF SOFTWARE PROJECT TO BE BUILT AND TESTED

604 — GENERATE MERKLE-BASED BUILD GRAPH FROM RECEIVED DEFINITION USING PLACEHOLDERS IN PLACE OF ACTUALIZED OUTPUTS FOR DEPENDENT ACTIONS

606 — PROVIDE BUILD GRAPH TO UNWINDER SERVICE

608 — ITERATIVELY PROCESS BUILD GRAPH AS SERIES OF API REQUESTS TO REMOTE BUILD EXECUTION SERVICE

610 — PROVIDE BUILD/TEST RESULT TO USER

REMOTE ORCHESTRATOR FOR SOFTWARE BUILD AND TEST TOOL

TECHNICAL FIELD

The present disclosure relates generally to building and testing of software systems and, more specifically, to a remote orchestrator for building and testing software for use in autonomous vehicle (AV) infrastructure.

BACKGROUND

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 6 illustrates a flowchart of operations performed by an example remote build orchestrator system, according to some aspects of the disclosed technology.

DETAILED DESCRIPTION

Overview

Figure 1:
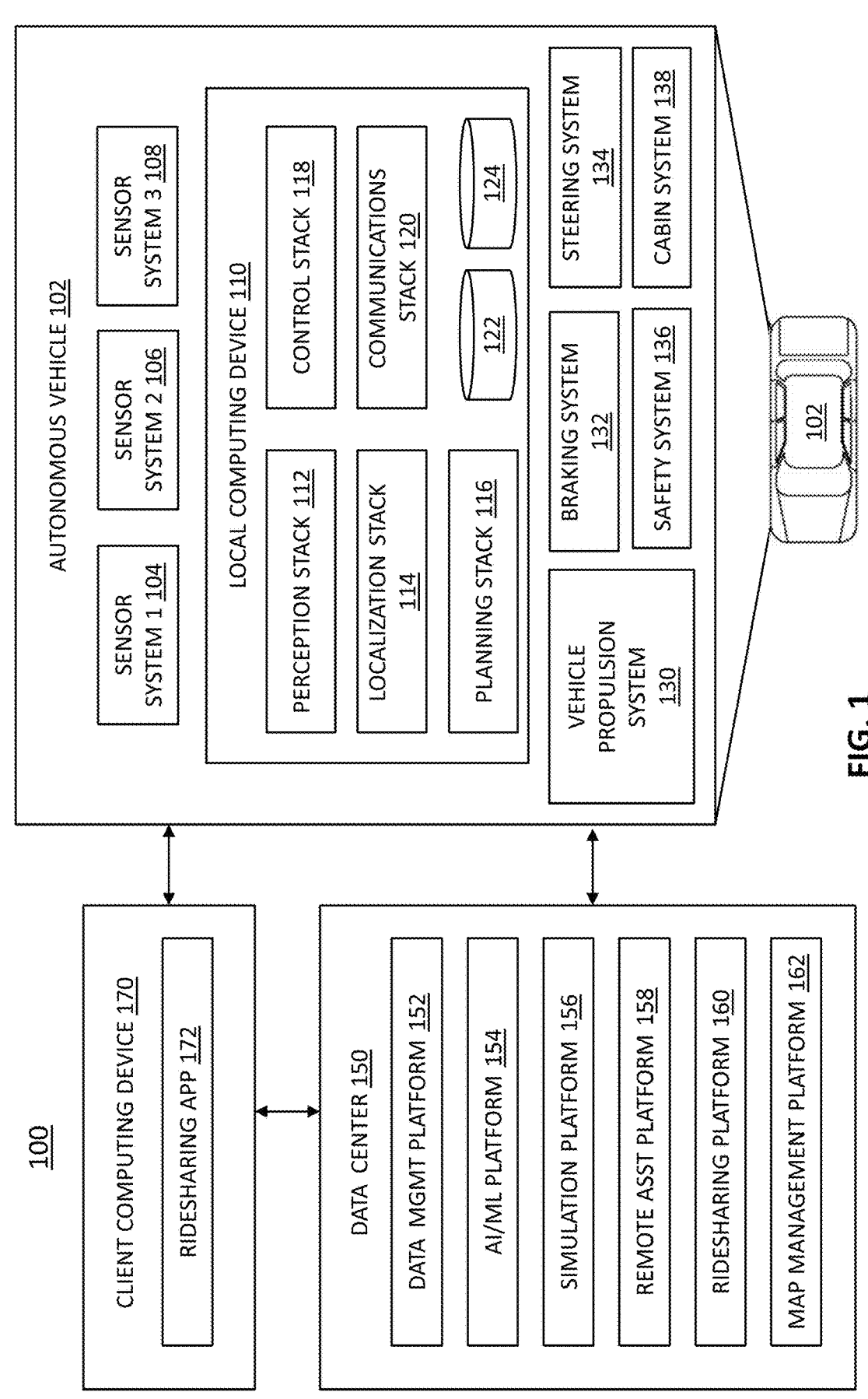
FIG. 1 illustrates an example system environment that can be used to facilitate AV dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

As rideshare services provided by AVs have become more widely available, the complexity of AV automation has continued to increase. Automation of driving operations may be seen as adding a layer of cognitive intelligence to basic vehicle platforms. As perception and planning algorithms have become increasingly responsible for critical decisions made by AVs, software has emerged as a primary driver of AV innovation. It will be recognized that as the amount of software used to control AV operations grows, so does the need to deploy advanced software engineering methods and tools to manage and accommodate the complexity, size, and criticality of such software.

A great amount of compute resources may be consumed orchestrating and waiting for software build actions to be completed by a remote build execution (RBE) service. In accordance with features of embodiments described herein, a Merkle build graph-based remote orchestration service (which may be referred to herein as a remote build orchestrator) is deployed to provide cost savings in RBEs. In particular embodiments, a remote build orchestrator is capable of executing large, complex build graphs that were previously required to be orchestrated by large, expensive machines without the intervening need of those machines. In particular embodiments, output of a remote build orchestrator is largely identical to that of an open source software build and test automation tool, such as Bazel, and build failures return the contents of stdout and stderr as if it were a local operation.

In accordance with particular embodiments, a remote build orchestrator includes a Merkle Generator module, or service, and a Merkle Unwinder module, or service. A Merkle Generator module may construct a full Merkle representation of a build graph. A Merkle Unwinder module may consume a single build graph passed on as an invocation request and process it into a series of application programming interface (API) requests that can be executed by an RBE service. A Merkle, or hash, tree is a tree in which every node that is a leaf is labeled with the cryptographic hash of a data block and every node that is not a leaf (e.g., a branch or inner node (inode)) is labeled with the cryptographic hash of the labels of its child nodes. A Merkle tree enables efficient and secure verification of the contents of large data structures. Demonstrating that a leaf node is a part of a given binary hash tree requires computing a number of hashes proportional to the logarithm of the number of leaf nodes in the tree. A Merkle tree is therefore an efficient example of a cryptographic commitment scheme, in which the root of the tree is viewed as a commitment and leaf nodes may be revealed and proven to be part of the original commitment.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multicloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example Merkle Build Graphs for Remote Build Orchestrator

Although embodiments described herein may be implemented in connection with and find application to any number of different open source and/or commercial software build and test automation and related tools, in order to simplify explanation of concepts herein, embodiments may be described with specific reference to Bazel and/or Kubernetes. It should be noted that such references to Bazel and/or Kubernetes are for purposes of example and explanation only and should not be construed and/or viewed as limiting application of the embodiments described herein to those particular tools.

Kubernetes is a portable, extensible, open source platform for managing containerized workloads and services, that facilitates both declarative configuration and automation.

Bazel is an open-source software tool used for the automation of building and testing software. Bazel is similar to build tools such as Make, Apache Ant, and Apache Maven and builds software application from source code using rules. One of Bazel's goals is to establish a build system in which the inputs and outputs of build targets are fully specified, ensuring precise knowledge within the build system and thereby allowing for a more accurate analysis and determination of out-of-date build artifacts within the dependency graph of the build system. Making the dependency graph analysis more deterministic leads to potential improvements in build times by avoiding re-execution of unnecessary build targets. Build reliability is improved by avoiding errors where build targets might depend on out-of-date input artifacts.

Building and testing a large software project, such as may be required in connection with AV operation, may require execution of a number of individual actions that may or may not have dependencies upon one another. After all of the actions are performed, an aggregate result of the actions may be provided to the user. The build and test process may be represented as an action graph, with actions comprising nodes of the graph (and defined by inputs/command/outputs) and dependencies comprising edges. A build system typically has two responsibilities, including (1) constructing and representing the action graph and (2) executing the actions. In most current build systems, those two responsibilities are commingled due to the numerous dependencies involved. As such, construction of the action graph and execution of actions occur incrementally (and from a user's perspective, substantially simultaneously). Performing both of these tasks together is a pessimal utilization of compute resources and can be a very expensive (in terms of compute and other resources and the amount of time required) endeavor.

In accordance with features of embodiments described herein, construction and representation of an action graph is separated from execution of the actions in a principled manner such that less expensive machine resources may be used to hold the action graph while it is evaluated to a pass/fail result. Embodiments described herein result in resource savings and a better overall system design.

Figure 2A:
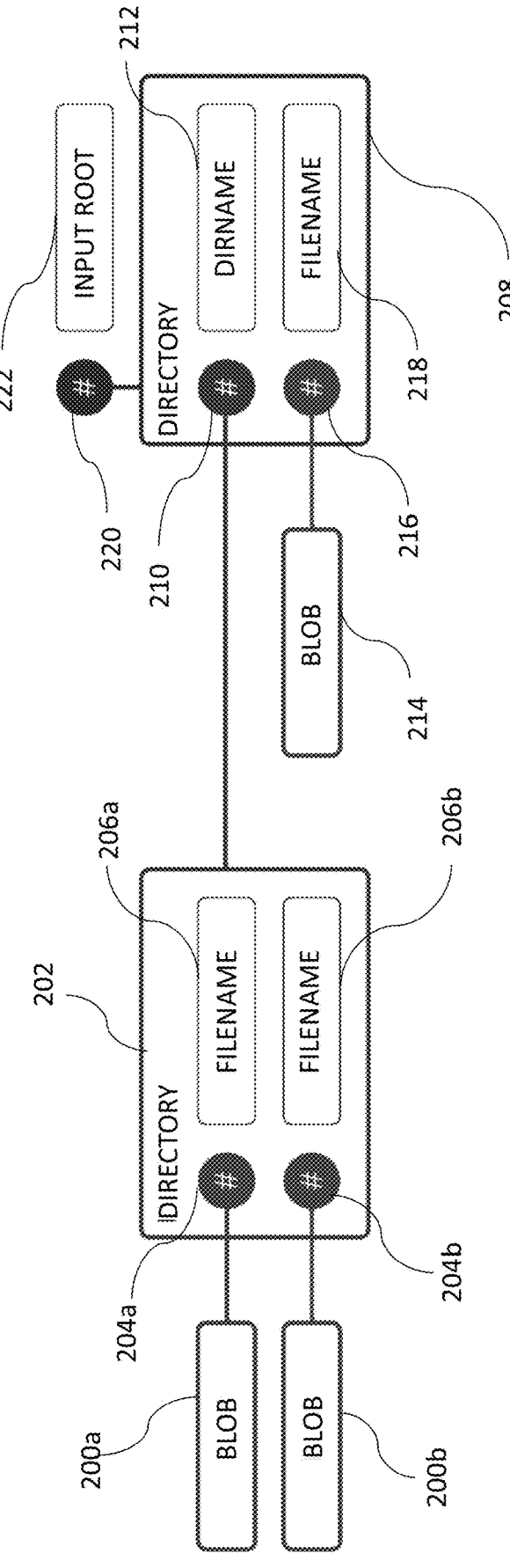
FIGS. 2A-2C illustrate simplified diagrams of Merkle tree representations, according to some aspects of the disclosed technology.

Bazel employs a concept of Merkle trees to represent directory structures for both input and output. Known as directory objects, these are essentially tiered and repeated hashings of the files that comprise the directory structure in such a way that at the end, the top level directory has a unique hash that is completely deterministically based on the structure and contents of the directory. This concept is illustrated in FIG. 2A. In particular, as shown in FIG. 2A, binary large objects (blobs) 200*a*, 200*b* are represented in a first directory 202 by hashes 204*a*, 204*b*, associated with filenames 206*a*, 206*b*. A blob may be a file-like object of immutable, raw data and may be read as text or binary data or converted for processing by specific applications. Examples of blobs include complex files, such as images, video, and audio. In particular embodiments, the blob data type is used in databases to store multimedia and other types of files that are too large to be saved in regular fields.

First directory 202 is represented in a second directory 208 by a hash 210 and a directory name 212. Similarly, blob 214 is represented in the second directory 208 by a hash 216 and a filename 218. Finally, second directory 208 is represented by a hash 220 at input root 222.

Figure 2B:
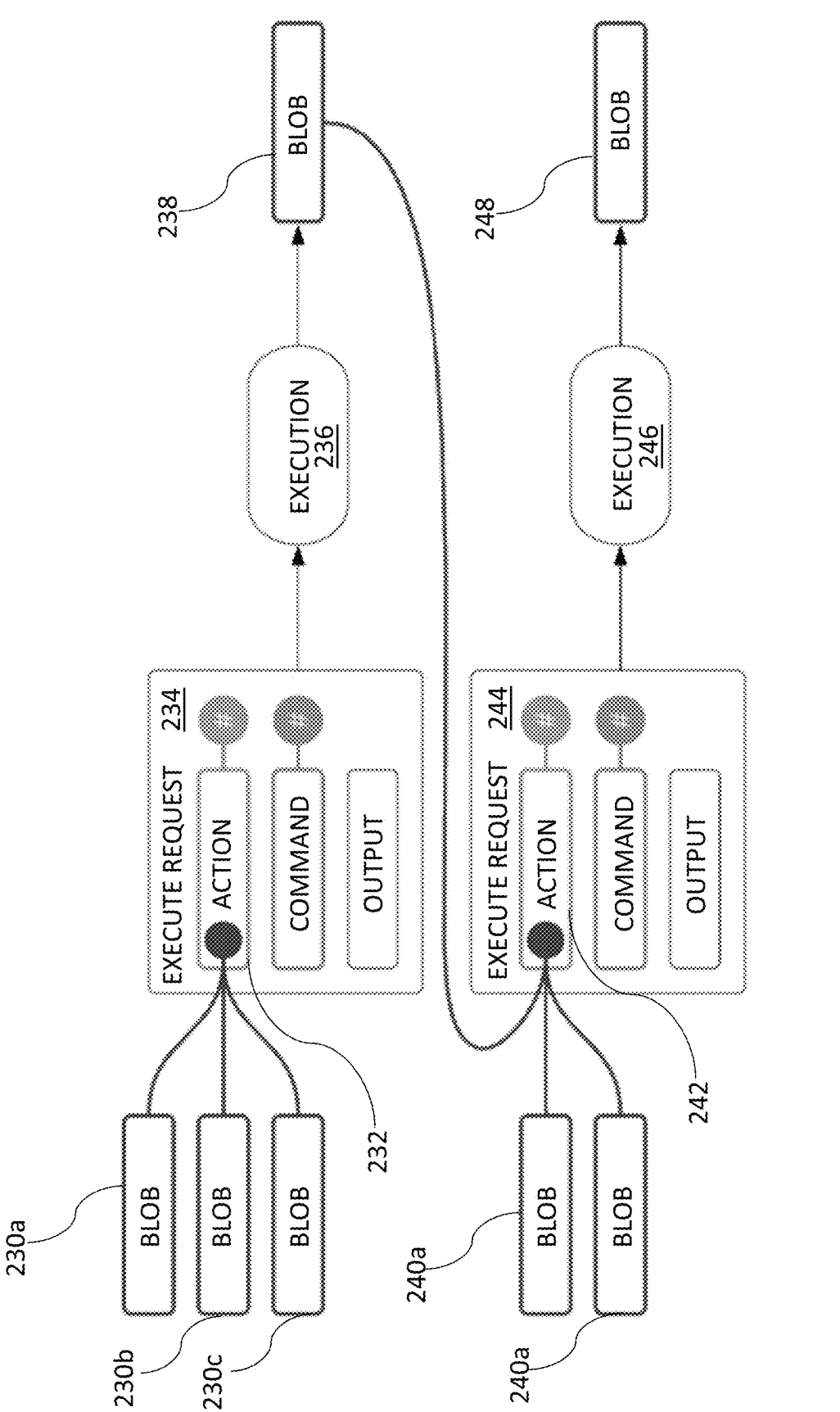

Bazel does not, however, use a Merkle representation for build graphs. On the contrary, for build graphs, each action must be executed to generate the actual resultant payload blobs, then those blobs are hashed for input to the next action. Every step is independent, essentially severed from necessary knowledge of the previous step. This concept is illustrated in FIG. 2B. In particular, in FIG. 2B, blobs 230*a*-230*c* are input to an action 232 of a first execute request 234. Execution 236 of action 232 results in a payload blob 238, which is input along with blobs 240*a*, 240*b*, to an action 242 of a second execute request 244. Execution 246 of action 242 results in a payload blob 248.

Figure 2C:
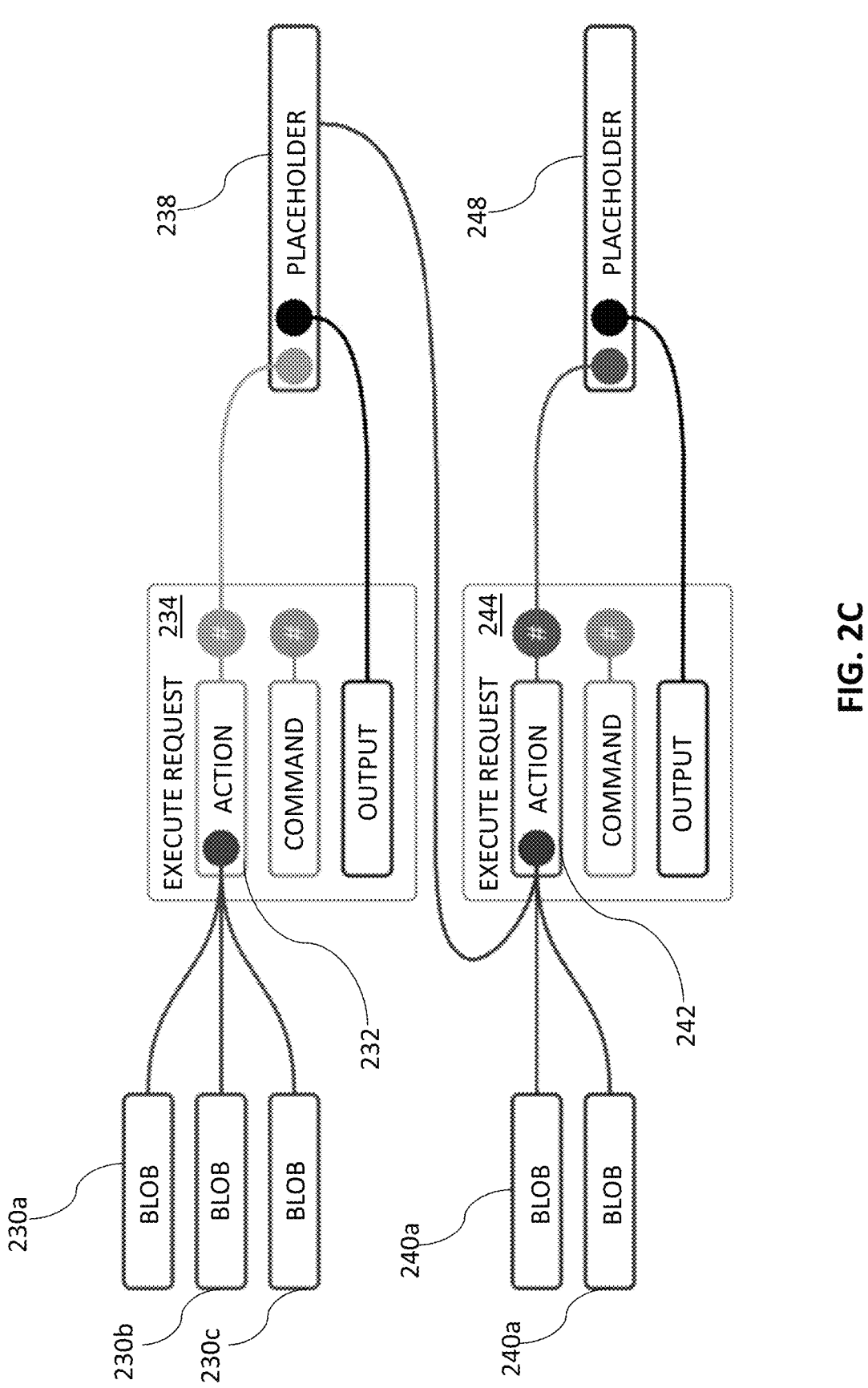

In contrast, in accordance with features of embodiments described herein, remote build orchestrator employs a Merkle representation for build graphs to preserve and represent dependencies between individual execution requests. It is through these dependencies that a Merkle build graph can be used to uniquely represent a complete Bazel Java invocation without the need for actually executing anything, all the while preserving the ability to be fully deterministic in construction. This concept is illustrated in FIG. 2C. In particular, as shown in FIG. 2C, payload blobs 238 and 244 of FIG. 2B are represented by placeholders 260, 262, such that executions 236, 246, are unnecessary to build the action graph.

In accordance with features of embodiments described herein, placeholders, such as placeholders 260, 262, must be uniquely, compactly, and deterministically represent a dependent action. In particular, placeholders are computationally unique signatures based on all of the inputs that would create the file represented by the placeholder. Assuming this property is met, then using the placeholder in the next step creates a Merkle graph representation of the entire build.

As will be described in greater detail hereinbelow, a build system can distinguish a real input from a placeholder input and will fill in the information for the placeholder once mapping from the placeholder to a real file/input Is available. The representation shown in FIG. 2C, due to its deterministic nature, allows incremental processing of the component Merkle tree and at each step maps individual actions and placeholders to actual API execution-ready equivalents. This process is referred to herein as unwinding the Merkle build graph and actualizing the placeholders and will be described in greater detail hereinbelow. This change in representation enables computation of the entire action graph up front so that there is a complete picture of the action graph that is more compact and that can be evaluated upfront without waiting for each action to be executed.

Example System for Implementing Remote Build Orchestrator

Figure 3:
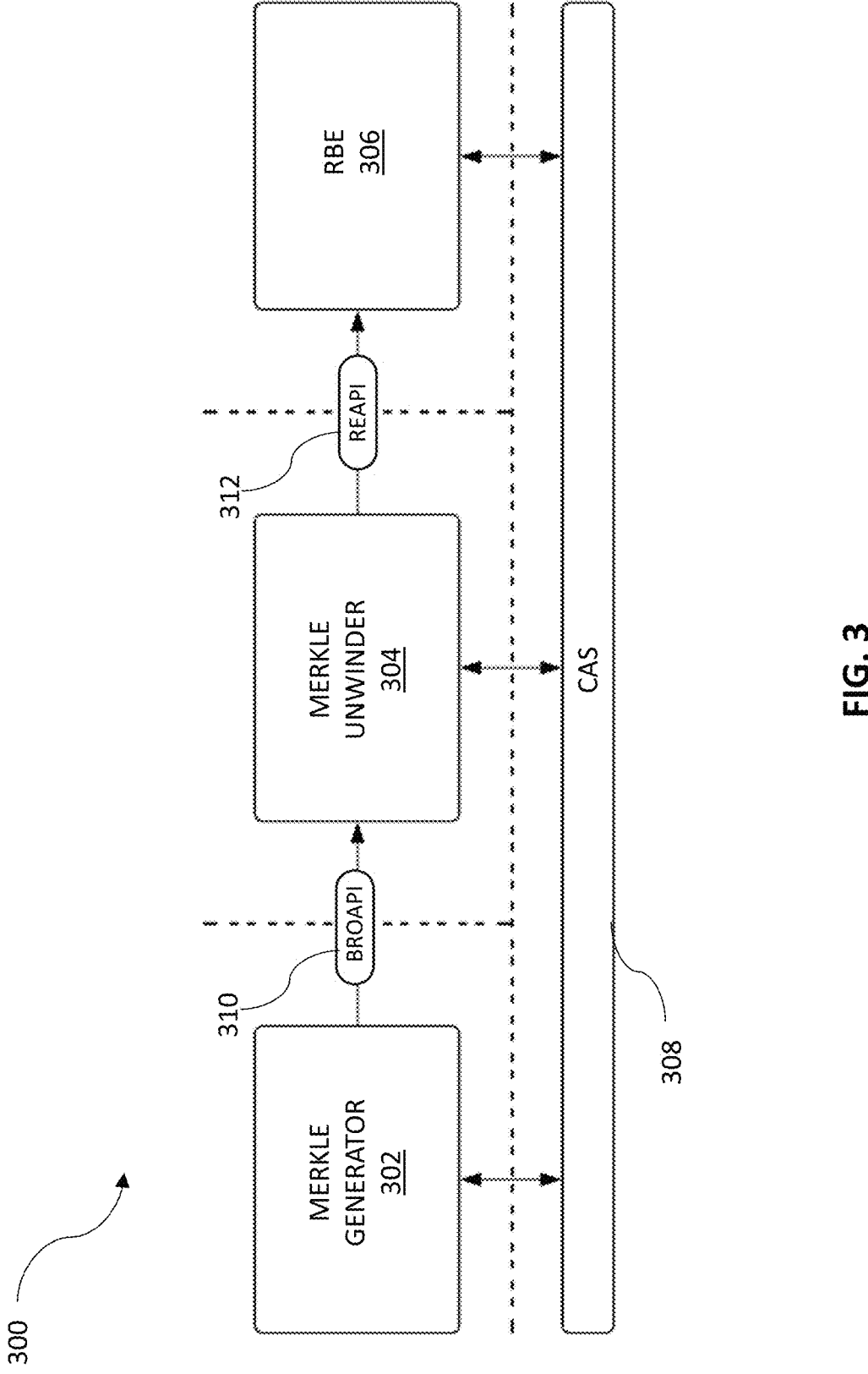
FIG. 3 illustrates a simplified block diagram of an example remote build orchestrator system, according to some aspects of the disclosed technology.

Referring now to FIG. 3, illustrated therein is a simplified block diagram of an example remote build orchestrator system 300 in accordance with features of embodiments described herein. As shown in FIG. 3, system 300 includes a Merkle generator service 302, a Merkle unwinder service 304, an RBE service 306, and a content addressable storage (CAS) 308. Merkle generator 302 constructs a full Merkle representation of a build graph, such as illustrated in FIG. 2C. The Merkle unwinder 304 consumes the build graph constructed by Merkle generator 302, which may be passed from module 302 as a BROAPI request (specifically, an InvocationRequest) 310, and processes the Merkle build graph into a series of API requests (specifically, Remote Execution API (or REAPI) requests) 312 to the RBE module 306, which executes the requests. In particular embodiments, each of the modules 302, 304, 306, may execute on a different machine or cluster of machines.

As previously noted, the system 300 provides a user interface that is completely separate from that of raw Bazel and may be used to ensure that there is no confusing overloading of the REAPI and to ensure that system 300 is in control of user feedback and that no counterintuitive and/or incorrect Bazel state is returned to the user.

Figure 4:
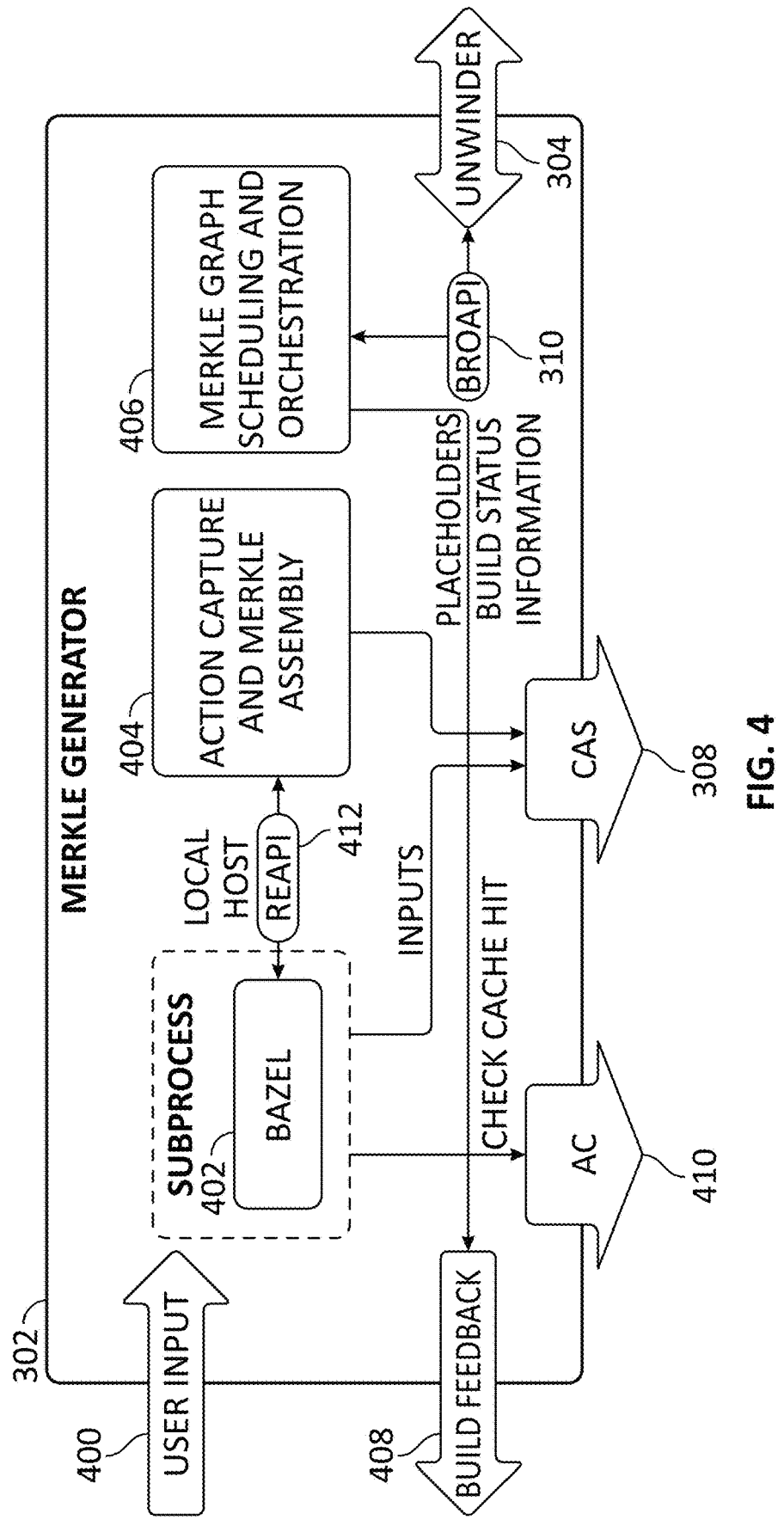
FIG. 4 illustrates a simplified block diagram of a Merkle generator service for the remote build orchestrator system of FIG. 3

FIG. 4 is a simplified block diagram of the Merkle generator 302 of FIG. 3. In particular embodiments, Merkle generator module 302 may be implemented as a user-invoked command line interface (CLI) tool that takes a target or set of target definitions as user input 400 received via a local Bazel Java interface 402 and in turn produces a Merkle representation (e.g., a build graph or an action graph) of the build to be computed. This self-contained Merkle representation can be transmitted via a defined BROAPI to Merkle unwinder 304 (FIG. 3). At a high level, the Merkle generator acts as an opaque wrapper around an underlying Bazel Java invocation, essentially using Bazel Java 402 as an assist in creating a complete Merkle tree. Additionally, the Merkle generator command line tool 302 may be capable of communicating with the Merkle unwinder service 304, receiving updates on the status of an existing build and reporting failures to the user. In particular embodiments, the API allows for reconnection after expected or unexpected gRPC termination and for fast resubmission of previously computed trees.

Referring again to FIG. 4, an action capture and Merkle assembly (ACMA) service 404 computes placeholder outputs (placeholders), computes the action graph, and turns the action graph into a representation that can be forwarded via a network connection to a Merkle graph scheduling and orchestration (MGSO) service 406. As noted above, placeholders comprise computationally unique signatures that are based on all of the inputs that would create the PH file. In preferred embodiments, placeholders are compact and deterministic. MGSO 406 receives the placeholders and actions and orchestrates the work, turning placeholders into actual files in the process incrementally until the build and test is complete, at which point results 408 are provided to the user.

In operation, CAS 308 stores data (source files, concrete inputs and outputs, build tools) necessary to perform actions in the build graph. Action cache (AC) 410 stores pass/fail results for every action executed.

In accordance with features of embodiments described herein, each of services 402, 404, and 406 may be executed on a different machine, or cluster of machines. It should be noted that Merkle trees produced by system 300 are naturally pruned of already computed branches, as Bazel Java 402 will not submit REAPI requests 412 to ACMA service 404 if there are entries in AC 410 for the action.

Figure 5:
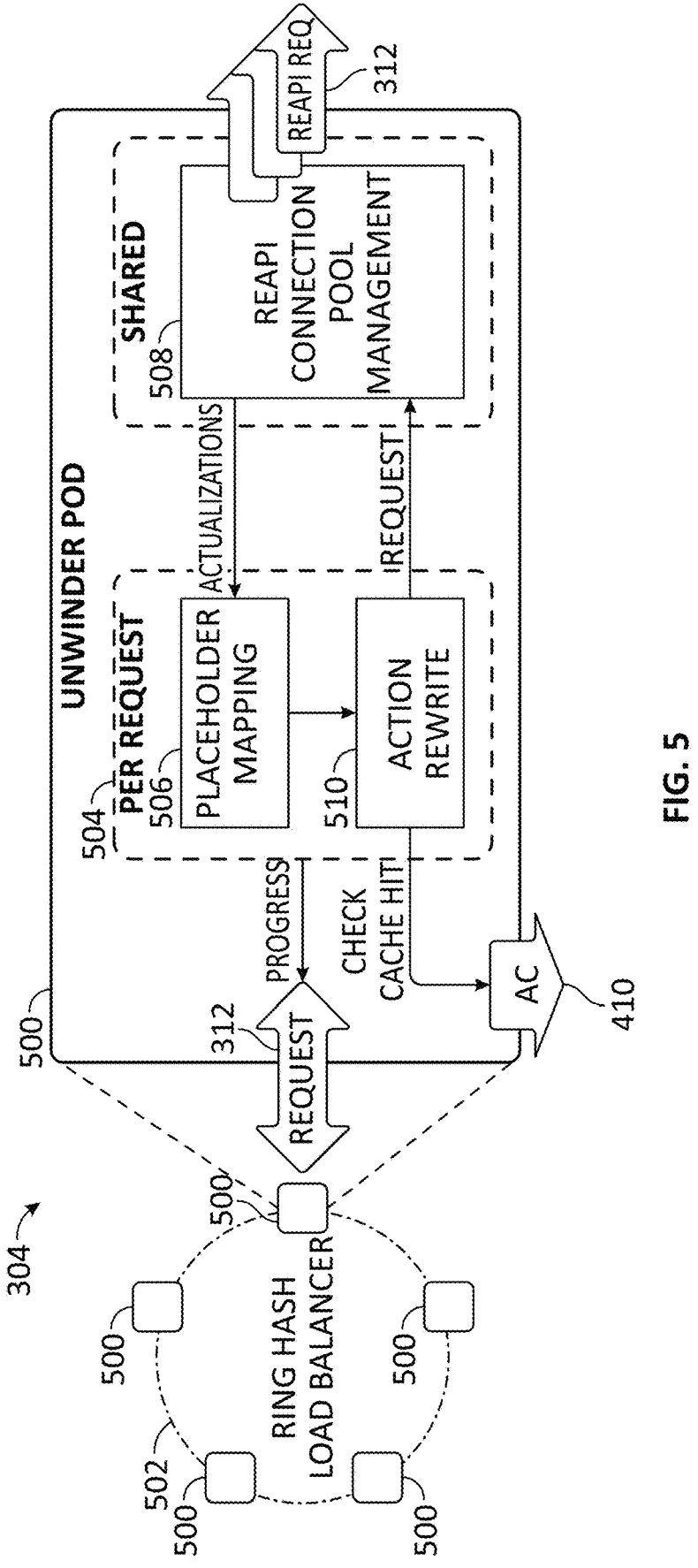
FIG. 5 illustrates a simplified block diagram of a Merkle unwinder service for the remote build orchestrator system of FIG. 3.

FIG. 5 is a simplified block diagram of the Merkle unwinder service 304. In particular embodiments, unwinder service 304 is implemented as unwinder pods 500, which are essentially Golang-based lightweight alternatives to Bazel Java remote execution algorithm. In operation, unwinder pods 500 take a Merkle build graph payload and drive the task to completion using REAPI requests 312 and RBE 306. Algorithmically, the process is similar to the process employed by Bazel.

A pod may be viewed as the smallest deployable unit of computing that can be created and managed in Kubernetes and includes a group of one or more containers, with shared storage and network resources, and a specification for how to run the containers. A pod's contents are co-located and co-scheduled and run in a shared context. A pod models an application-specific logical host and contains one or more application containers that are relatively tightly coupled. In non-cloud contexts, applications executed on the same physical or virtual machine are analogous to cloud applications executed on the same logical host. A pod can contain application containers as well as init containers that run during pod startup. In certain implementations, a pod is similar to a set of containers with shared namespaces and shared filesystem volumes.

In particular embodiments, load balancing among pods 500 is implemented using a ring hash selector 502 instead of, for example, round-robin or least-loaded selector, to ensure that requests are routed in a predictable manner and that state does not have to be centrally shared between nodes. Ring hash load balancing enables horizontal load balancing without requiring blocking on a central store to keep track of not rewritten actions and as yet unprocessed actions. This is advantageous in that it allows for unwinder pods 500 to be designed as a fully stateless service. If an unwinder pod is lost, all state data associated with the requests serviced by that pod will also be lost; however, actualized Merkle REAPI requests are fully equivalent to their Bazel REAPI request counterparts and will be cached in AC 410, which allows for request fast-forwarding to the point where the previous unwinder pod failed should the client choose to retry.

In operation, as previously noted, the full graph representation of the build as constructed by Merkle generator 302 is forwarded to Merkle unwinder service 304 (residing on a separate machine). It will be presumed that actions are sorted in a topological order as required by BROAPI. Merkle unwinder service 304 takes actions off the top on a per request 504 basis and creates a placeholder mapping 506. In particular, as placeholders are encountered, they are inserted into the mapping table and the results (i.e., real bytes) as available from actualized REAPI computational nodes via a REAPI connection pool management service 508, which manages REAPI requests 312 to RBE service 306 (FIG. 3), will be used to replace the placeholders. In particular, real bytes returned after an action is executed are injected into actions that have placeholder files for those bytes and an action rewrite 510 is performed. That action will then be ready for a REAPI service to perform computations and actualize any other files that come from that. It will be recognized that this process can go many layers deep. Placeholder mapping 506 and action rewrite 510 are iteratively performed for the entire action tree rewriting actions one layer at a time. Once all actions are rewritten, the build is complete. In accordance with features of embodiments described herein, these are performed as part of an out-of-band service.

In particular embodiments, BROAPI should always have an invocation-id HTTP header set, which may be used by the ring-hash load balancer 502 to determine placement and should be an injection to a single InvocationRequest payload (nominally, one complete Merkle build graph and associated metadata). This is different from the request-id header, which is generally unique per API call. A GUID based on the contents of the InvocationRequest is recommended to facilitate proper ring-hash request colocation. Additionally, BROAPI must represent all nodes in the Merkle build graph in a flat array, and the array must be topologically sorted. This allows for critical performance optimizations in system 300 implementation. Additionally, it leaves open future API revisions that may support tree streaming and pipelining. Unwinder pods 500 may opt to fail fast if this invariant is violated but are not required to, as performing full tree analysis may be prohibitively expensive or impossible.

It will be recognized that a classical problem in large software build and test project is that a user (e.g., a working engineer) may make a change to an isolated part of the project and would like to determine what other parts of the project were affected by the change. System 300 enables the entire system to be rebuilt and tested at a relatively low cost compared to previous systems due to the small size of the build graph as enabled by use of placeholders.

Example Techniques for Implementing Remote Build Orchestrator

FIG. 6 is a flowchart 600 illustrating example operations that may be performed by a remote build orchestrator, such as orchestrator 300, in accordance with particular embodiments. In certain embodiments, one or more of the operations illustrated in FIG. 6 may be executed by one or more of the elements shown in FIGS. 1, and/or 3, for example.

In 602, a definition of a software project to be built and tested is received into the system (e.g., system 300 at Merkle generator service 302).

In 604, a Merkle-based build graph is generated from the received definition using placeholders in place of actualized outputs for dependent actions (i.e., actions with inputs based on the outputs of other actions).

In 606, the Merkle-based build graph is forwarded over a network connection provided to a Merkle unwinder service (e.g., Merkle unwinder service 304).

In 608, the build graph is iteratively processed as a series of API requests to a remote build execution service (e.g., RBE 306). In particular, as described in detail above, the unwinder service takes actions in topological order on a per request basis and performs placeholder mapping and action rewrites until the entire build graph has been processed and all of the placeholders have been rewritten with actual data.

In 610, aggregate pass/fail results for the build and test are provided to the user.

Although the operations of the example method shown in and described with reference to FIG. 6 are illustrated as occurring once each and in a particular order, it will be recognized that the operations may be performed in any suitable order and repeated as desired. Additionally, one or more operations may be performed in parallel. Furthermore, the operations illustrated in FIG. 6 may be combined or may include more or fewer details than described.

Example Processor-Based System

Figure 7:
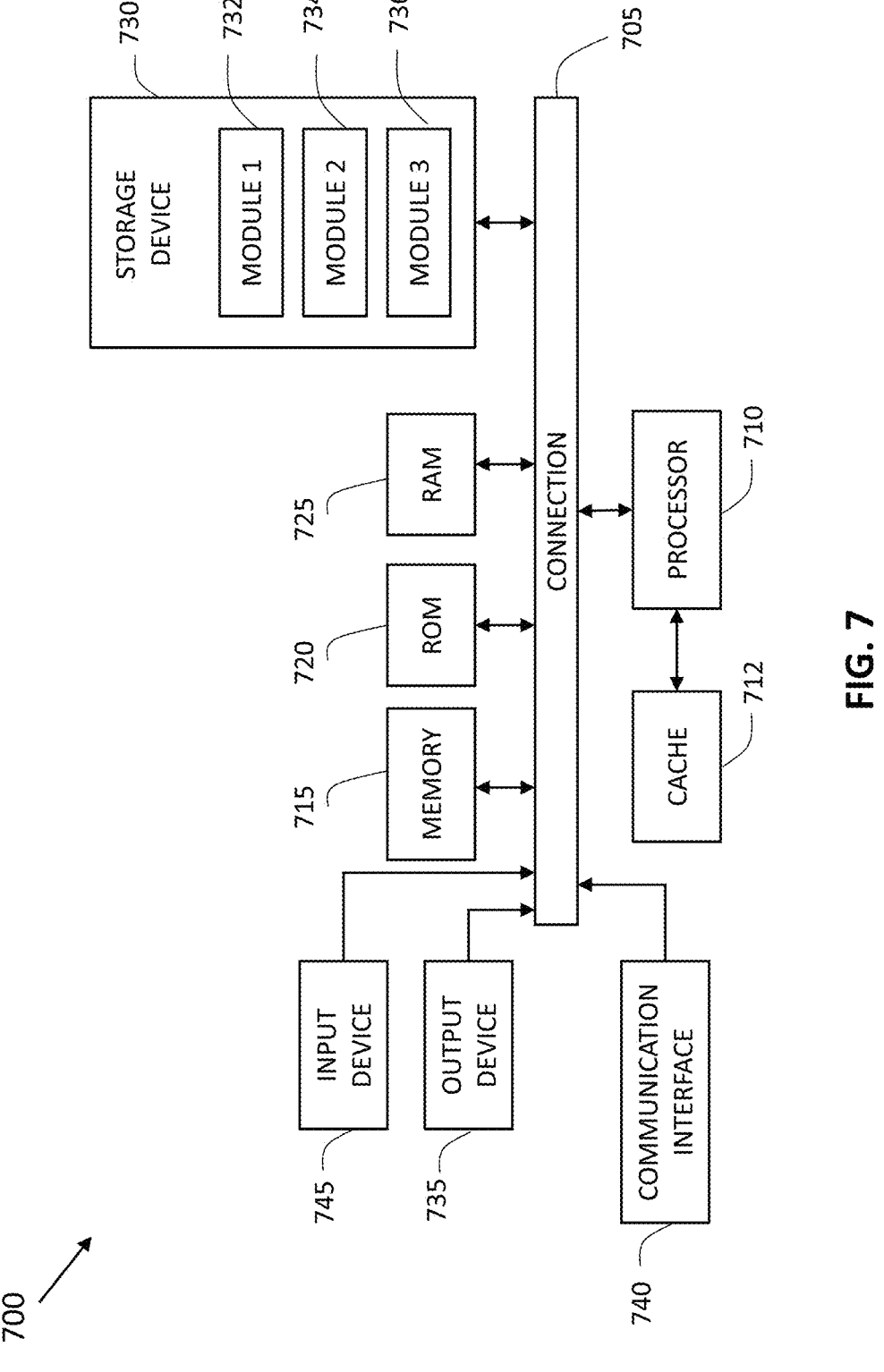
FIG. 7 illustrates an example processor-based system with which some aspects of the disclosed technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random- Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

An aspect of the disclosure provides a remote build orchestrator for building and testing a software program, the remote orchestrator including a generator service for generating a build graph from a definition of the software program input to the remote orchestrator, the build graph including a plurality of actions, in which the actions are defined by inputs, outputs, and commands, and in which outputs of actions that are dependent on other actions for inputs are represented in the build graph by placeholders; an unwinder service for receiving the build graph from the generator service and processing the build graph into a series of requests for execution of the actions; and a remote build execution service for executing the actions in response to the received requests and returning results of the executing to the unwinder service.

In some examples, the unwinder service uses the results returned from the remote build execution service to replace the placeholders with actual data resulting from the executing.

In some examples, the unwinder service includes a plurality of unwinder pods.

In some examples, the unwinder service includes a ring hash load balancer for load balancing the unwinder pods.

In some examples, the build graph includes a Merkle representation.

In some examples, the placeholders include signatures that uniquely and deterministically represent the dependent actions.

In some examples, which the requests include REAPI requests.

In some examples, each of the generator service, the unwinder service, and the remote broker execution service are executed on separate machines.

In some examples, the build graph is provided to the unwinder service via a network connection.

In some examples, subsequent to completion of execution of all of the actions by the remote broker execution service, the remote build orchestrator generates an aggregate pass-fail result based on the execution of all of the actions.

Another aspect of the disclosure provides a computer-implemented method for building and testing a software program, the computer-implemented method including generating a build graph from a definition of the software program input to a remote build orchestrator, the build graph including a plurality of actions, in which the actions are defined by inputs, outputs, and commands, and in which outputs of actions that are dependent on other actions for inputs are represented in the build graph by placeholders; processing the build graph into a series of requests for execution of the actions; and executing the actions in response to the received requests to produce results, in which the generating, the processing, and the executing are each performed by a different machine entity.

In some examples, the method also includes using the results to replace the placeholders with data including the results.

In some examples, the method also includes performing ring hash load balancing in connection with the processing.

In some examples, the build graph includes a Merkle representation.

In some examples, the placeholders include signatures that uniquely and deterministically represent the dependent actions.

In some examples, the method also includes, subsequent to completion of execution of all of the actions, returning an aggregate pass-fail result based on the execution of all of the actions.

Yet another aspect of the disclosure provides one or more non-transitory computer-readable storage media including instructions for execution that, when executed by a processor, are operable to cause to be performed operations including generating a build graph from a definition of the software program input to a remote build orchestrator, the build graph including a plurality of actions, in which the actions are defined by inputs, outputs, and commands, and in which outputs of actions that are dependent on other actions for inputs are represented in the build graph by placeholders; processing the build graph into a series of requests for execution of the actions; executing the actions in response to the received requests to produce results; and subsequent to completion of execution of all of the actions, returning an aggregate pass-fail result based on the execution of all of the actions.

In some examples, the operations also include using the results to replace the placeholders with data including the results; and re-executing the actions including the placeholders subsequent to the replacing.

In some examples, the build graph includes a Merkle representation of the software project.

In some examples, the placeholders include signatures that uniquely and deterministically represent the dependent actions.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A remote build orchestrator system for building and testing a software program, the remote build orchestrator system comprising:

a generator service configured to generate, from a definition of the software program input to the remote build orchestrator system, a Merkle-based build graph comprising a plurality of actions, wherein the actions are defined by inputs, outputs, and commands, and wherein outputs of actions that are dependent on other actions for inputs are represented in the Merkle-based build graph by placeholders, wherein each placeholder comprises a computationally unique signature based on all of the inputs that would create a file represented by the placeholder;

an unwinder service configured to:

receive the Merkle-based build graph from the generator service; and process the Merkle-based build graph in topological order into a series of remote execution application programming interface (API) requests for execution of the actions by a remote build execution service; and the remote build execution service configured to:

execute the actions in response to the remote execution API requests; and return results of the executing to the unwinder service, wherein the unwinder service is further configured to use the returned results to replace the placeholders with actual output data resulting from the executing, and rewrite subsequent actions for execution.

2. The remote build orchestrator system of claim 1, wherein the unwinder service comprises a plurality of unwinder pods.

3. The remote build orchestrator system of claim 2, wherein the unwinder service comprises a ring hash load balancer for load balancing the unwinder pods.

4. The remote build orchestrator system of claim 1, wherein the signatures uniquely and deterministically represent dependent actions.

5. The remote build orchestrator system of claim 1, wherein each of the generator service, the unwinder service, and the remote build execution service are executed on separate machines.

6. The remote build orchestrator system of claim 1, wherein the Merkle-based build graph is provided to the unwinder service via a network connection.

7. The remote build orchestrator system of claim 1, wherein subsequent to completion of execution of all of the actions by the remote build execution service, the remote build orchestrator generates an aggregate pass-fail result based on the execution of all of the actions.

8. A computer-implemented method for building and testing a software program, the computer-implemented method comprising:

generating, from a definition of the software program input to a remote build orchestrator system, a Merkle-based build graph comprising a plurality of actions, wherein the actions are defined by inputs, outputs, and commands, and wherein outputs of actions that are dependent on other actions for inputs are represented in the Merkle-based build graph by placeholders, wherein each placeholder comprises a computationally unique signature based on all of the inputs that would create a file represented by the placeholder;

processing the Merkle-based build graph in topological order into a series of remote execution application programming interface (API) requests for execution of the actions;

executing the actions in response to the remote execution API requests to produce results; and using the results to replace the placeholders with actual output data of the executing, and rewrite subsequent actions for execution, wherein the generating, the processing, and the executing are each performed by a different machine entity.

9. The computer-implemented method of claim 8, further comprising performing ring hash load balancing in connection with the processing.

10. The computer-implemented method of claim 8, wherein the signatures uniquely and deterministically represent dependent actions.

11. The computer-implemented method of claim 8, further comprising, subsequent to completion of execution of all of the actions, returning an aggregate pass-fail result based on the execution of all of the actions.

12. One or more non-transitory computer-readable storage media comprising instructions for execution that, when executed by a processor, cause the processor to perform operations, the operations comprising:

generating, from a definition of a software program input to a remote build orchestrator system, a Merkle-based build graph comprising a plurality of actions, wherein the actions are defined by inputs, outputs, and commands, and wherein outputs of actions that are dependent on other actions for inputs are represented in the Merkle-based build graph by placeholders, wherein each placeholder comprises a computationally unique signature based on all of the inputs that would create a file represented by the placeholder;

processing the Merkle-based build graph in topological order into a series of remote execution application programming interface (API) requests for execution of the actions;

executing the actions in response to the remote execution API requests to produce results;

subsequent to completion of execution of all of the actions, returning an aggregate pass-fail result based on the execution of all of the actions;

using the results to replace the placeholders with actual data of executing; and re-executing the actions comprising the placeholders subsequent to the replacing.

13. The one or more non-transitory computer-readable storage media of claim 12, wherein the signatures uniquely and deterministically represent dependent actions.

* * * * *